United States Patent [19]
Plattner

[11] Patent Number: 5,875,771
[45] Date of Patent: Mar. 2, 1999

[54] SAW CABLE GUIDE

[76] Inventor: Josef Plattner, Gattern 34d, A-6200 Gallzein, Austria

[21] Appl. No.: 769,350

[22] Filed: Dec. 18, 1996

Related U.S. Application Data

[63] Continuation of PCT/AT96/00062 Mar. 29, 1996 published as WO96/33058 Oct. 24, 1996.

[30] Foreign Application Priority Data

Apr. 18, 1995 [AT] Austria ........................ 657/95

[51] Int. Cl.⁶ ........................................ B28D 1/08
[52] U.S. Cl. .................... 125/21; 125/12; 83/611; 451/168
[58] Field of Search ................. 125/21, 72; 451/168, 451/296, 311; 83/651.1, 661, 814, 816, 611; 242/168, 189; 299/35

[56] References Cited

U.S. PATENT DOCUMENTS

| | | |
|---|---|---|
| 2,577,523 | 12/1951 | Horton . |
| 4,765,307 | 8/1988 | Kubo . |
| 4,986,252 | 1/1991 | Holmes et al. ............. 125/21 |
| 5,060,628 | 10/1991 | Ishida . |
| 5,645,040 | 7/1997 | Bieri Jun. ................. 125/21 |
| 5,699,783 | 12/1997 | Kubo ........................ 125/21 |

FOREIGN PATENT DOCUMENTS

| | | | |
|---|---|---|---|
| 459355 | 6/1913 | France ....................... | 125/21 |
| 95/18692 | 7/1995 | WIPO . | |
| 95/28263 | 10/1995 | WIPO . | |

*Primary Examiner*—Robert A. Rose
*Assistant Examiner*—George Nguyen
*Attorney, Agent, or Firm*—Herbert L. Lerner; Laurence A. Greenberg; Werner H. Stemer

[57] ABSTRACT

A universally applicable device for guiding the cable of cable saw systems for sawing concrete, brickwork, natural stone, and other masonry products. A bearing plate supports (and attaches) the guide to a base. A support projects upwardly from the bearing plate. A transverse beam ca be fixed at any height on the support. The transverse beam has one or two free ends. A hollow end beam that can be stopped and rotated by 360° around the longitudinal axis of the transverse beam is disposed on each free end of the transverse beam. The end beam carries deflection rollers on which the incoming and outgoing saw cable is guided to the workpiece and to the cable saw, respectively. Each of the rollers are borne in a roller housing that is rotatable by 360° about the longitudinal axis of the end beam. Any cutting planes or flush cuts and all angles to the work piece can therefore be set, without having to perform any substantial changeover procedure for the cable saw between different cutting jobs.

16 Claims, 10 Drawing Sheets

SAW CABLE GUIDE

CROSS-REFERENCE TO RELATED APPLICATION

This is a continuation of my international application PCT/AT96/00062, which was filed Mar. 29, 1996 and which designated the United States.

BACKGROUND OF THE INVENTION

1. Field of the Invention

The invention relates to a cable guide in cable saw systems for sawing masonry, such as work pieces made of concrete, brickwork, natural stone, quarry stone, etc., by means of an endlessly revolving saw cable.

2. Description of the Related Art

U.S. Pat. No. 2,577,523 discloses a device of this general kind, wherein two individual rollers that are each rotatable about 360° are borne in a hollow axle that is held perpendicular to a support. The saw cable is guided via the rollers from the cable saw to the work piece to be cut. The saw cable thereby runs through the hollow axle between the two rollers. Another such device is required for guiding the cable from the work piece back to the cable saw. In spite of the fact that the individual rollers swing independently of each other, the possibilities for adjusting the cable are limited.

SUMMARY OF THE INVENTION

It is accordingly an object of the invention to provide a saw cable guide, which overcomes the above-mentioned disadvantages of the heretofore-known devices and methods of this general type and which provides for a compact cable guide which allows the setting of all geometrical cutting planes and all angles between the incoming and the outgoing part of the saw cable.

It is a further object of the invention to provide a small, light, quickly dismantling cable guide for various cuts, without having to constantly dismantle and adjust a heavy cable saw, and to simplify changeover duties for the operating personnel.

It is yet a further object of the invention to provide a system which performs flush cuts on all planes and angle settings.

It is again a further object to provide a system which allows automatic setting of the angles of the cable guidance rollers by stretching the saw cable.

Finally, it is another object of the invention to cover the free lengths of cable between the cable guide and the cable saw in order to improve safety for the operating personnel in case that the cable breaks.

With the foregoing and other objects in view there is provided, in accordance with the invention, a cable guide for a cable saw which is used for sawing masonry and similar materials. The cable guide comprises:

a bearing plate with which the cable guide may be supported on a base, such as a wall or a floor; a support member disposed on the bearing plate; a transverse beam extending from the support, the transverse beam having a longitudinal axis and a free end;

a hollow end beam disposed on the free end of the transverse beam, the hollow end beam having a longitudinal axis and two free ends and being rotatably supported about the longitudinal axis of the transverse beam;

two roller housings, each of the roller housings being rotatably supported on a respective one of the free ends of the end beam about the axis of the hollow end beam; and two cable deflection rollers respectively disposed in the roller housings, the two cable deflection rollers defining a common tangent projecting through the hollow end beam.

In accordance with an added feature of the invention, the hollow end beam and the roller housings are each rotatable about 360°.

A cable saw system comprises at least two such cable guides, one of which is associated with the part of the saw cable that moves from the cable saw to the work piece, the other of which is associated with the part of the saw cable that moves back from the work piece to the cable saw. For large cable sawing jobs, for example in quarries or mines, another cable guide can be used for each further deviation of one or both parts of the saw cable.

As an alternative, a second embodiment combines two individual cable guides. This embodiment thereby includes a support standing on end on the bearing plate, a transverse beam extending from the support, which has a longitudinal axis and two free ends, two hollow end beams, each one being disposed on a free end of the transverse beam and rotatable by 360° about the axis of the transverse beam, and having a longitudinal axis and two free ends;

four roller housings, each of which is disposed on a free end of a hollow end beam and rotatable by 360° about the longitudinal axis of the end beam; and four cable guidance rollers, each of which is borne such that it can be rotated in a roller housing, wherein the two cable guidance rollers of each end beam form a common tangent running through the hollow end beam.

The result is a small, light and quickly dismantling cable guide for various cuts, where the heavy cable saw does not have to be constantly dismantled and adjusted, thereby representing a considerable improvement for the operating personnel.

In accordance with an additional feature of the invention, the transverse beam is height-adjustably carried on the support.

In accordance with another feature of the invention, the transverse beam includes a collar which is clampable to the support. Also, the hollow end beam may include a collar which is clampable to the free end of the transverse beam.

In accordance with again another feature of the invention, each of the roller housings has a collar which is clampable to a respective one of the free ends of the hollow end beam.

Advantageously, the bearing plate and the support may be interconnected with a swivel joint.

In accordance with a concomitant feature of the invention, there is provided a telescoping protective tube attached to the roller housing and extending from the cable guide to the cable saw. The protective tube thereby covers a free length of saw cable extending between the cable saw and the cable guide. The telescoping covers substantially improve the safety for the operating personnel against cable snapping and breaking, in that the free lengths of cable are covered between the cable guide and the cable saw.

Other features which are considered as characteristic for the invention are set forth in the appended claims.

Although the invention is illustrated and described herein as embodied in a saw cable guide, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

DESCRIPTION OF THE PREFERRED EMBODIMENTS

Referring now to the figures of the drawing in detail and first, particularly, to a first embodiment illustrated in FIGS. 1–7, a cable guide comprises a bearing plate 1, which is attached on a base, such as, for instance, on a floor, a wall, or the like. A support 2 is welded or screwed thereto, and a transverse beam 3 is height-adjustably supported on the support 2. The beam 3 has a clip or a collar which is clamped on the support 2 with a stop or other height-adjusting member. At the free ends of transverse beam 3, extending at an H shape, are two hollow end beams 4, which— independently of each other—can be rotated by 360° about the longitudinal axis of the transverse beam 3. For the purpose of stopping them at any desired angle, the end beams 4 each have a clip or collar 7 that can be clamped to the transverse beam 3. A roller housing 6 is disposed at each free end of each hollow end beam 4, the roller housing being rotatable by 360° about the longitudinal axis of the hollow end beam 4. Cable guide rollers 5 (deflection rollers) are borne in the roller housings 6. Roller housings 6 also have a clampable stopping device 8 in the form of a clip or collar. The rollers 5 are disposed in open housings or cases 6, offset to the side of the longitudinal axis of the end beam, such that both rollers 5 of each end beam 4 form a common tangent lying in the longitudinal axis of the end beam. A saw cable 12 enters the cable guide via one of the two rollers 5 and leaves the cable guide again via the second roller 5 of the same end beam 4. The cable 12 thereby runs through the hollow end beam 4 between the two rollers 5.

Figure 1:
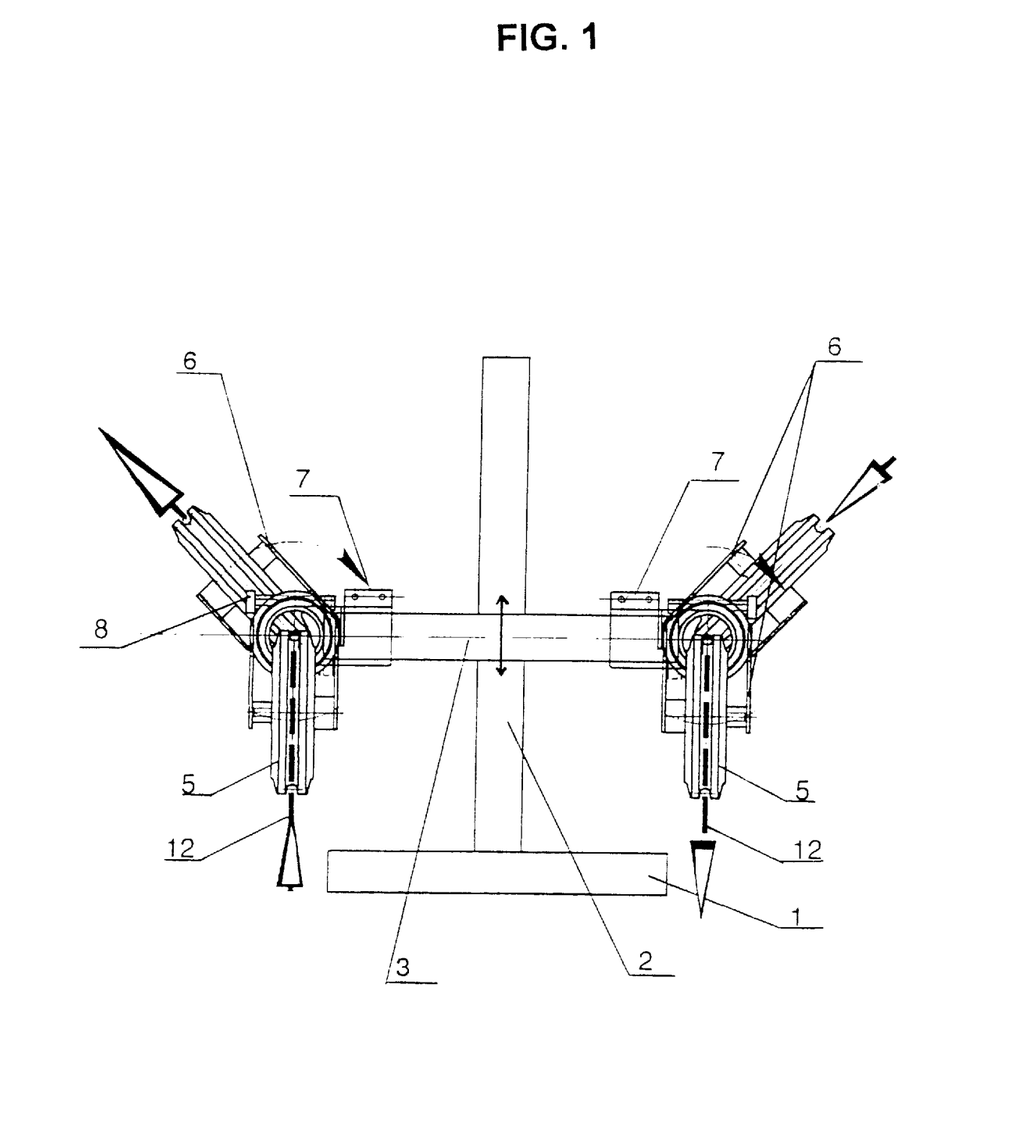
FIG. 1 is a front elevational view of a first embodiment of a cable guide in accordance with the invention.
Figure 2:
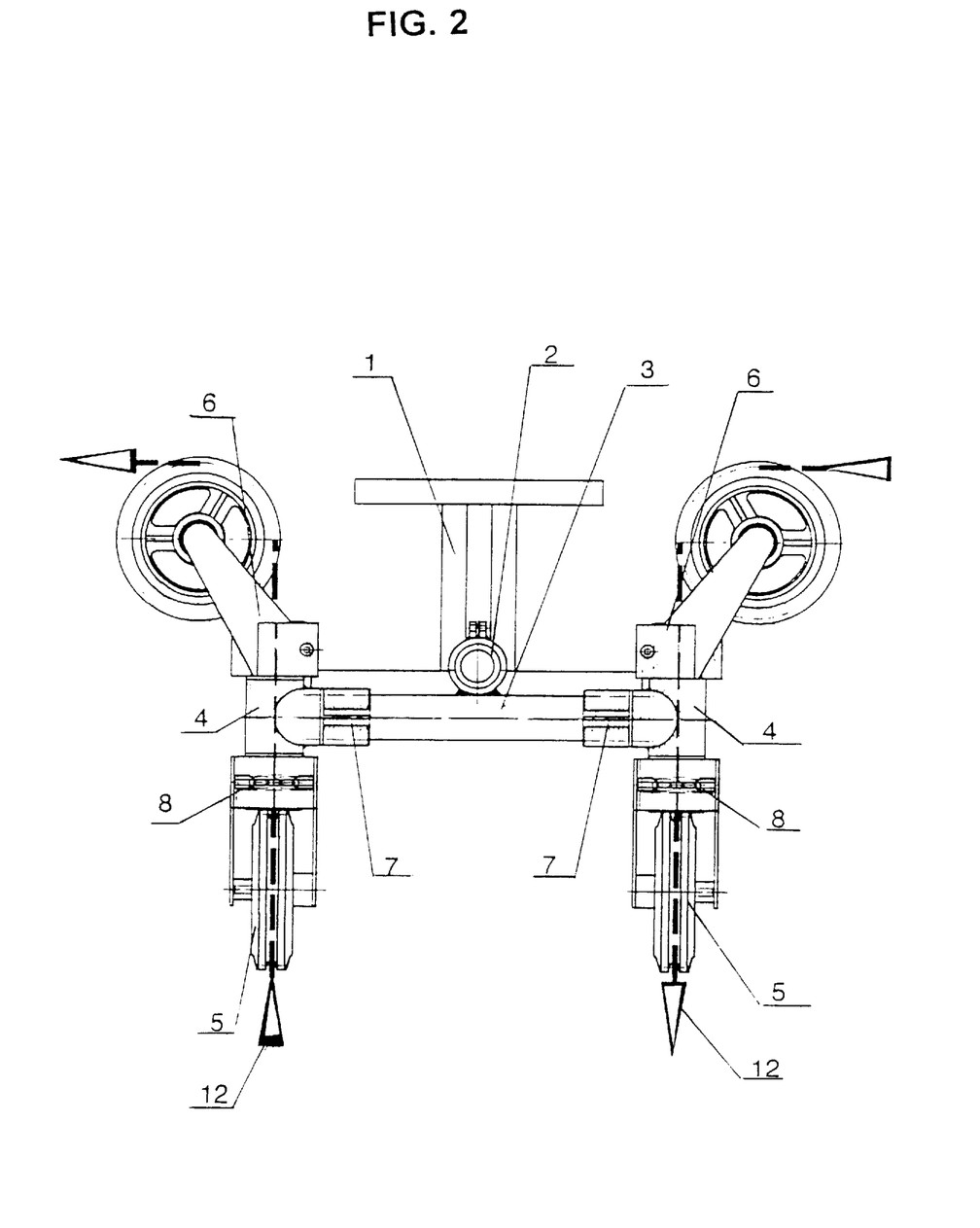
FIG. 2 is a top plan view of the cable guide of FIG. 1.
Figure 3:
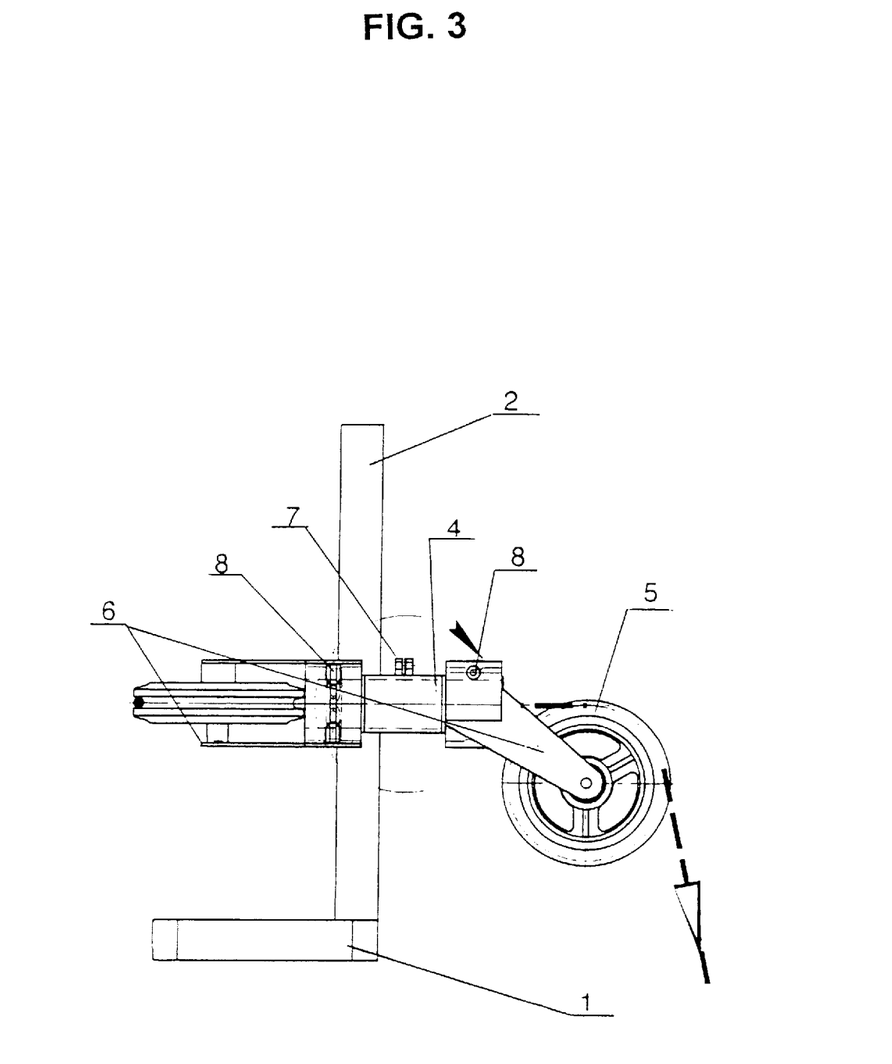
FIG. 3 is a side elevational view thereof.
Figure 4:
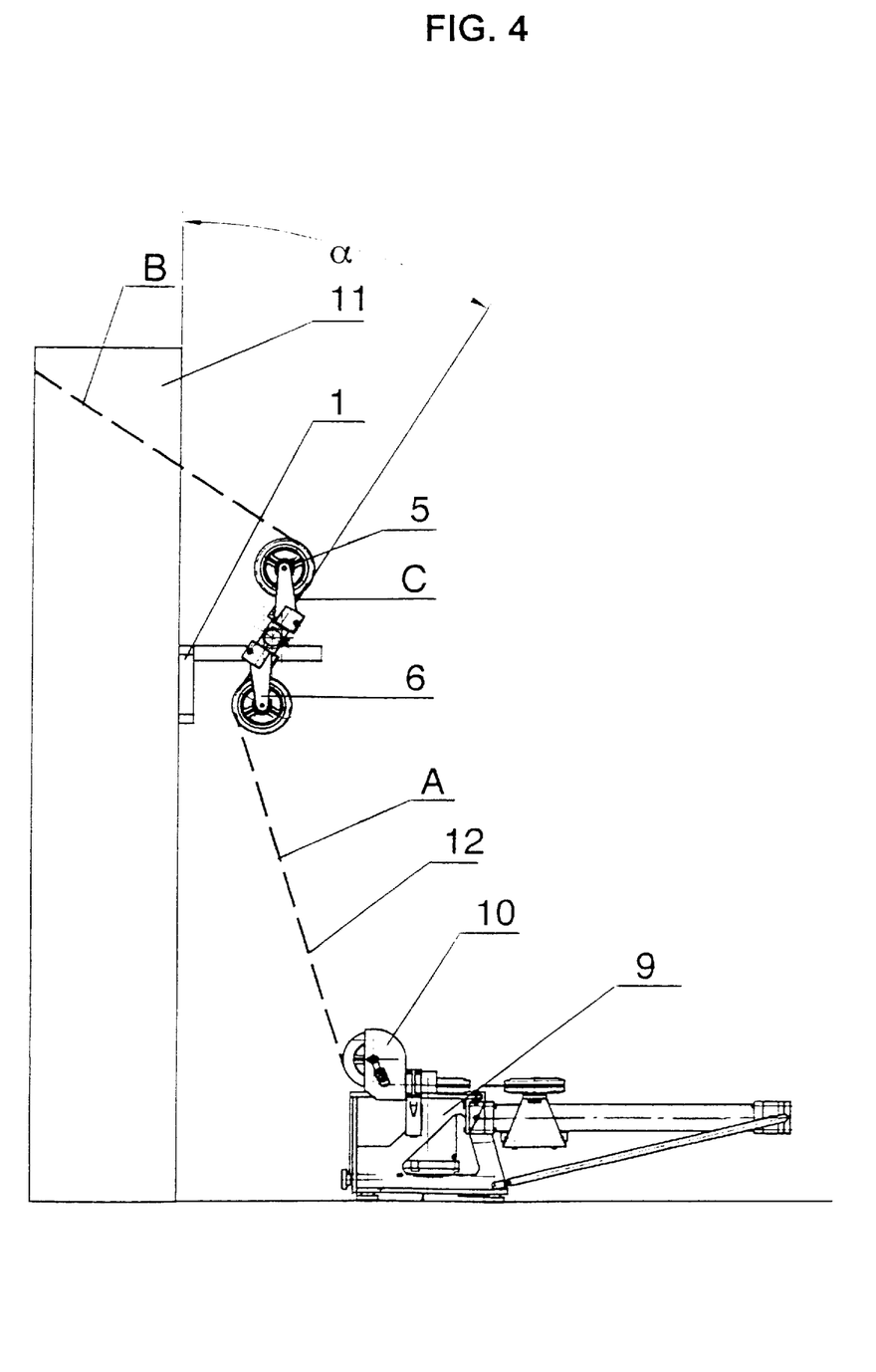
FIG. 4 is a side elevational view of a cable saw system with a cable guide according to the invention.
Figure 5:
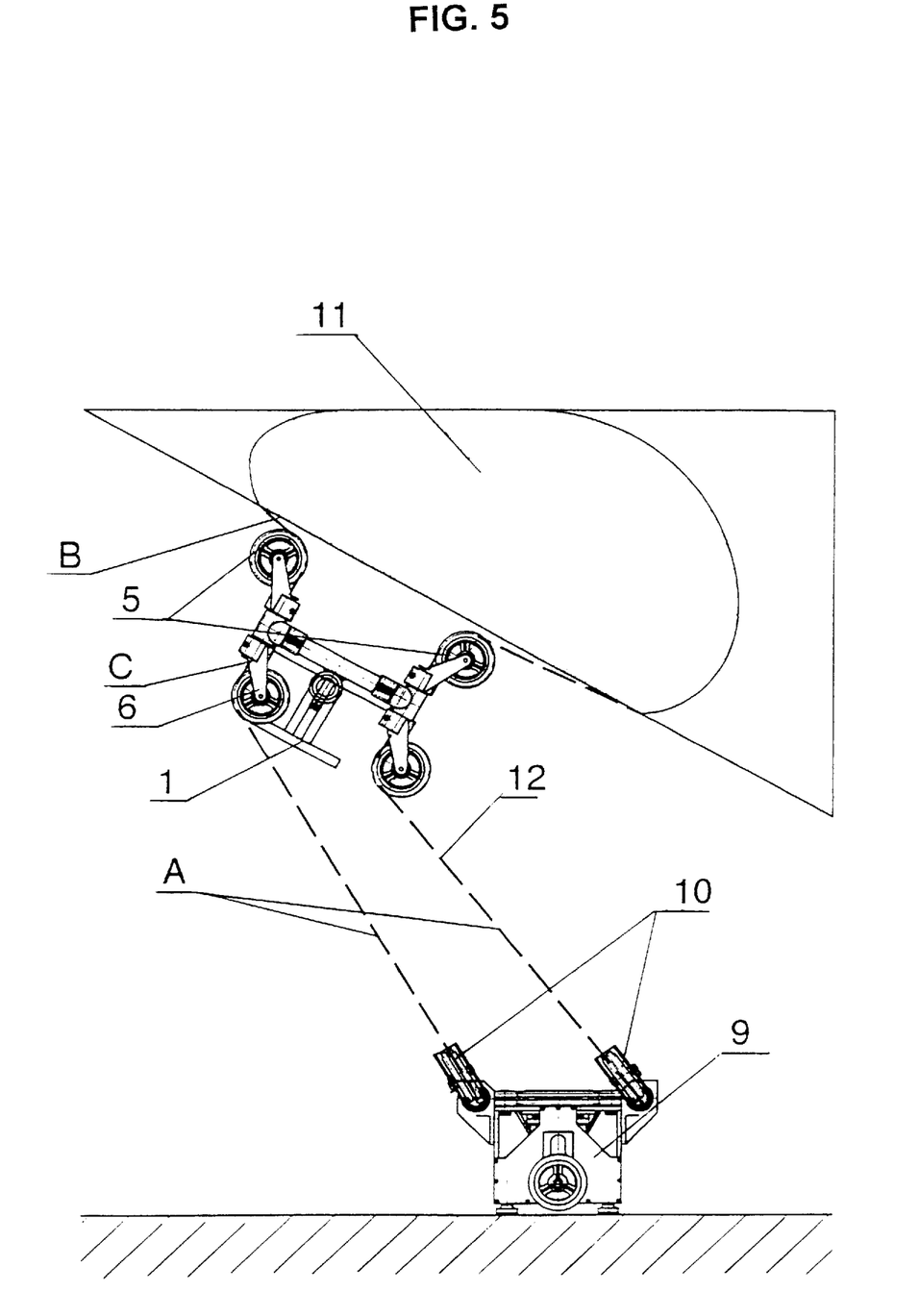
FIG. 5 is a top plan view of another cable saw system with a cable guide according to the invention.
Figure 6:
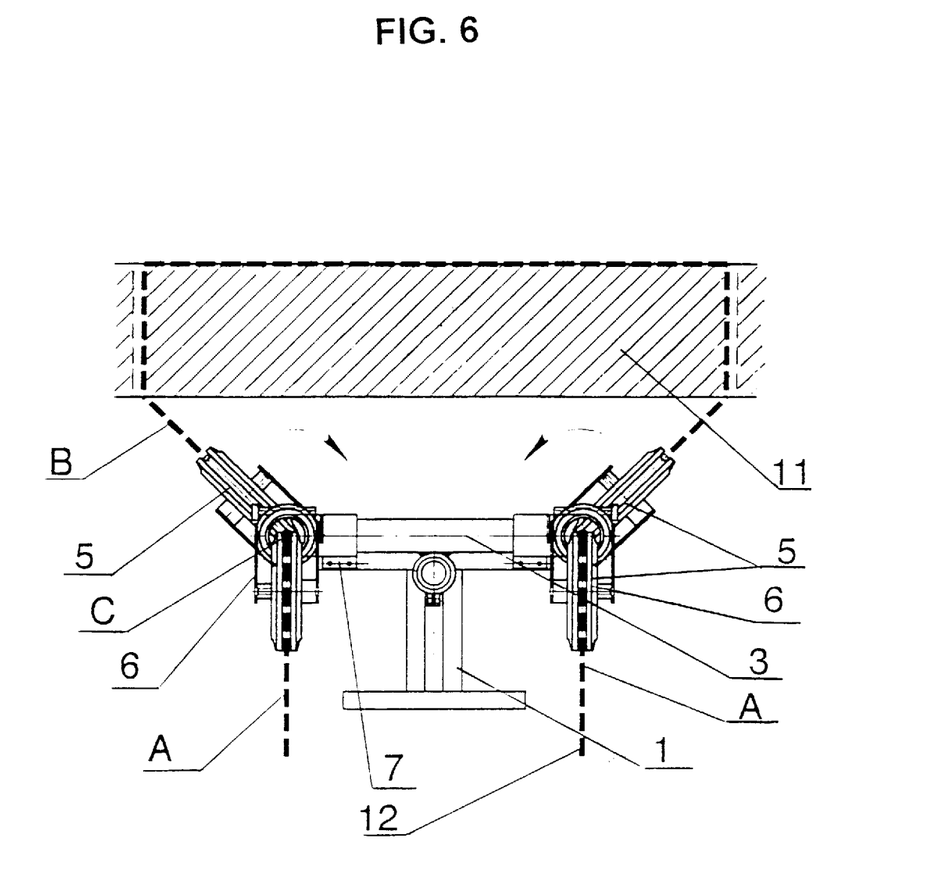
FIG. 6 is a top plan view of the cable guide of FIG. 2 in a position for a flush cut.
Figure 7:
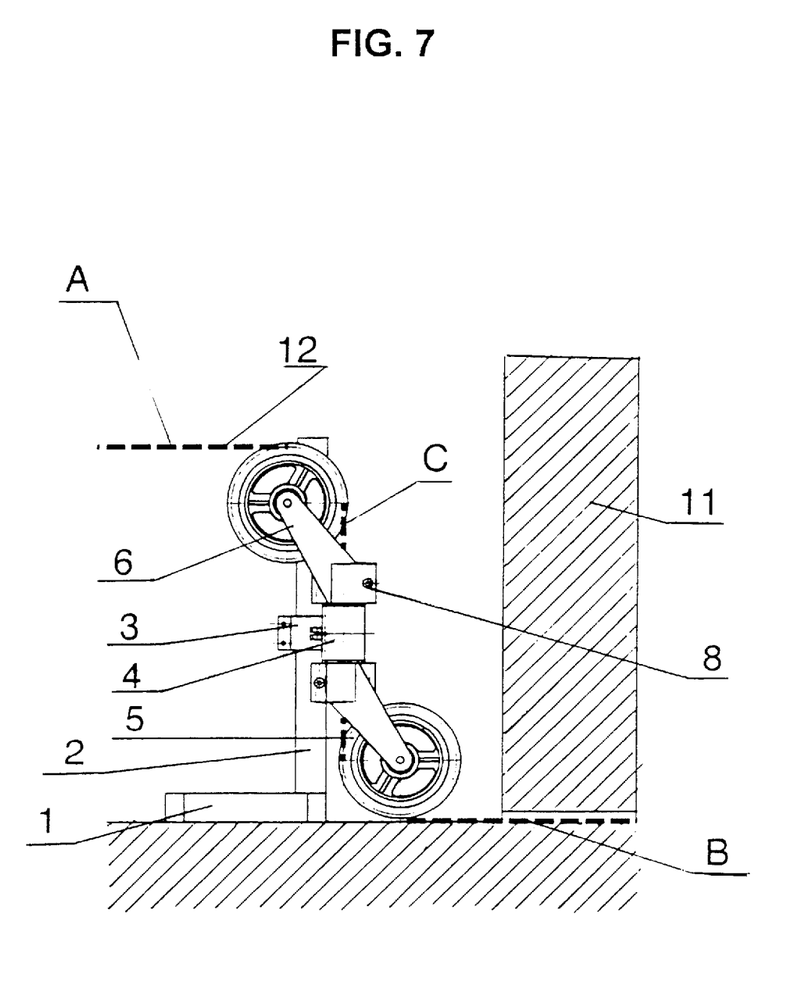
FIG. 7 is a side elevational view of the device of FIG. 6.

Due to the complete rotatability of the hollow end beam 4 and the roller housing 6, the saw cable 12 can be guided on any cable guidance plane A, B, C and at any angle α to a work piece 11 and preferably also to a cable saw 9, as shown, for example, in FIGS. 4 and 5. Preferably, cable saw 9 also has rotatable rollers 10. In FIGS. 6 and 7, the cable guide is positioned such that a cut that is flush with the ground can be made in the work piece 11 (forming a wall). To this end, the two end beams 4 are attached to the transverse beam 3 in parallel to the support, and the transverse beam 3 is attached to the support 2 at the corresponding height such that the saw cable 12 practically touches the ground. Both cable guidance rollers 5 on the machine side are, in turn, stopped at the position corresponding to the cable saw 9. However, the two cable guidance rollers 5 on the machine side are freely rotatable such that they can swing towards each other as the cut increases, as shown in FIG. 6. It would also be possible not to stop the roller housing on the machine side, since it swings into the required position anyway as the saw cable 12 is stretched.

Figure 8:
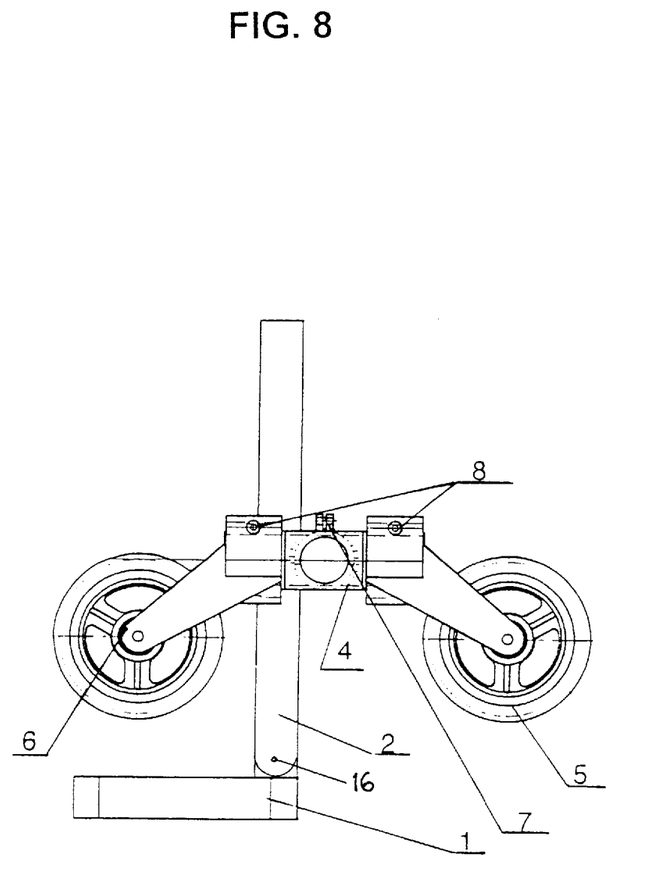
FIG. 8 is a side elevational view view of a second embodiment of the cable guide according to the invention.
Figure 9:
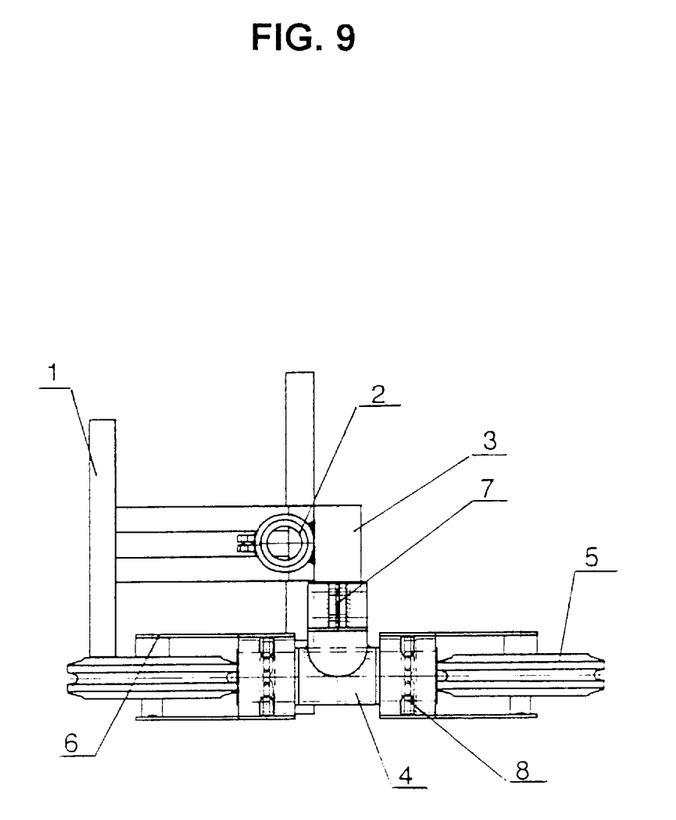
FIG. 9 is a top plan view thereof.

Referring now to FIGS. 8 and 9, there is described a further embodiment of the cable guide with a slightly different roller set. Here, a transverse beam is disposed on the support 2 which in turn projects upwardly from the bearing plate 1. The height of the transverse beam is adjustable and it can be rotated. The transverse beam only has one free end. There is therefore only one hollow end beam 4, on which two roller housings 6—each having a roller 5—are borne such that they can rotate around the longitudinal axis of the end beam 4. A plurality of these devices can be used for large cable sawing jobs in quarries or mines, and the like. However, at least two such devices are required for cable guidance for a cable saw system. In this embodiment, in particular, it may be advantageous to have a swivel joint 16 between the support 2 and the bearing plate 1, in order to further increase the adjusting possibilities for the cable guide.

Figure 10:
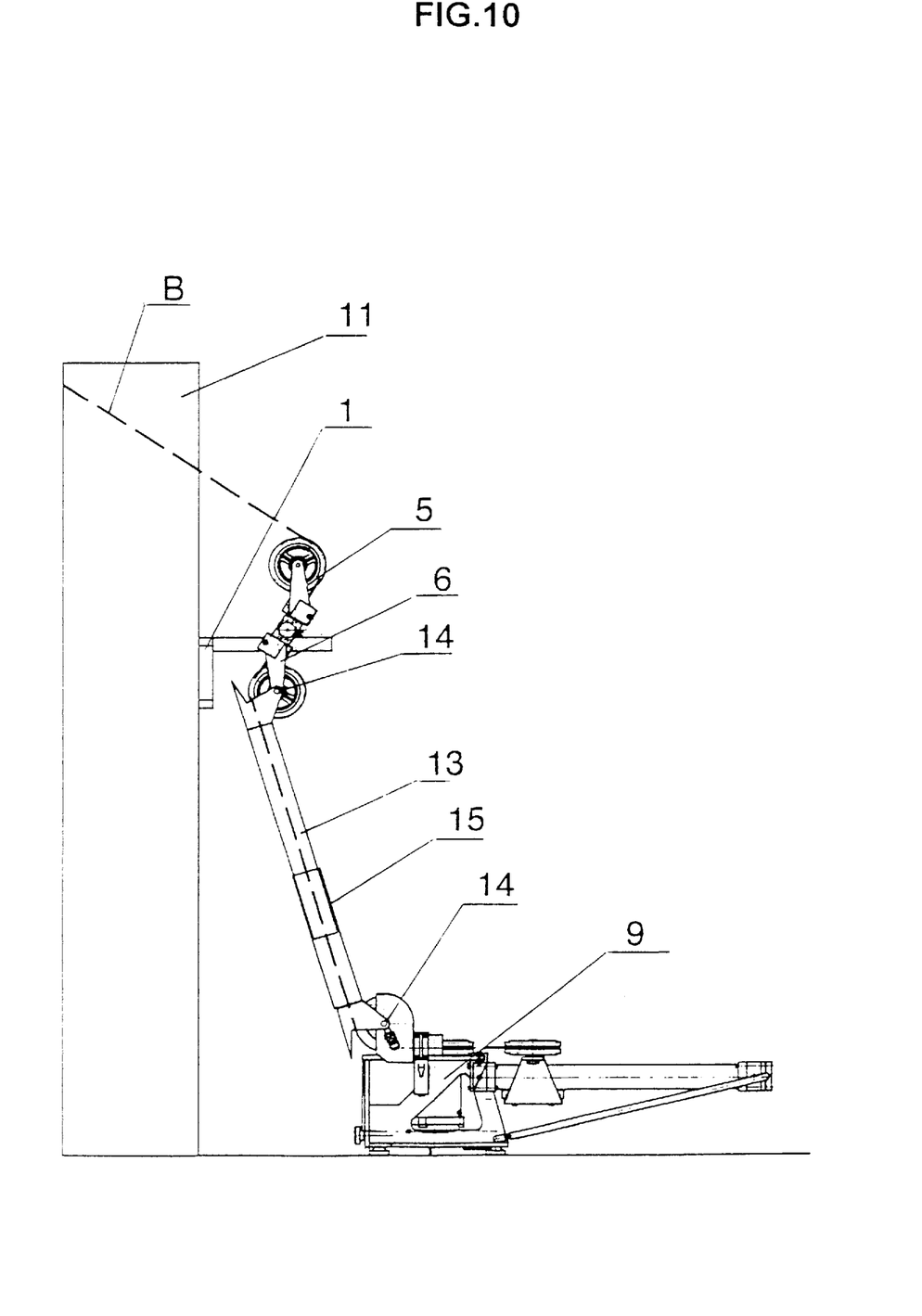
FIG. 10 is a view of the cable saw system of FIG. 4 with protective covers.

Referring now to the embodiment illustrated in FIG. 10, the free cable lengths 13 between the cable guide and the cable saw 9 are covered with telescoping tubes 15 that are adjustable in length. The tubes are attached to the axes 14 of the rollers 5 and they are provided as protection for operating personnel in case the cable breaks.

In a particularly advantageous embodiment, the saw cable 12 is equipped with diamondiferous cutting pearls (diamond-laced pearls).

I claim:

1. In a cable saw for sawing masonry with a saw cable, a cable guide, comprising:

a bearing plate for supporting the cable guide on a base;

a support member disposed on said bearing plate;

a transverse beam extending from the support, said transverse beam having a longitudinal axis and a free end;

a hollow end beam disposed on the free end of said transverse beam, said hollow end beam having a longitudinal axis and two free ends and being rotatably supported about the longitudinal axis of said transverse beam;

two roller housings, each of said roller housings being rotatably supported on a respective one of said free ends of said end beam about the axis of said hollow end beam; and two cable deflection rollers respectively disposed in said roller housings, said two cable deflection rollers defining a common tangent projecting through said hollow end beam.

2. The device according to claim 1, wherein said hollow end beam and said roller housings are each rotatable about 360°.

3. The device according to claim 1, wherein said transverse beam is height-adjustably carried on said support.

4. The device according to claim 3, wherein said transverse beam includes a collar which is clampable to said support.

5. The device according to claim 1, wherein said hollow end beam includes a collar which is clampable to said free end of said transverse beam.

6. The device according to claim 1, wherein each of said roller housings has a collar which is clampable to a respective one of said free ends of said hollow end beam.

7. The device according to claim 1, including a swivel joint connecting said bearing plate with said support.

8. The device according to claim 1, including a telescoping protective tube attached to said roller housing and extending from the cable guide to the cable saw, said protective tube covering a free length of saw cable extending between the cable saw and the cable guide.

9. In a cable saw for sawing masonry with a saw cable, a cable guide, comprising:

a bearing plate for supporting the cable guide on a base;

a support member disposed on said bearing plate;

a transverse beam extending from the support, said transverse beam having a longitudinal axis and two free ends;

two hollow end beams each disposed on a respective one of said free ends of said transverse beam, said hollow end beams each having a longitudinal axis and two free ends and being rotatably supported about the longitudinal axis of said transverse beam; and four roller housings, each of said roller housings being rotatably supported on one of said free ends of said end beams about the axis of a respective said hollow end beam; and four cable deflection rollers respectively disposed in said roller housings, each two of said four cable deflection rollers together defining a common tangent projecting through a respective said hollow end beam.

10. The device according to claim 9, wherein said hollow end beam and said roller housings are each rotatable about 360°.

11. The device according to claim 9, wherein said transverse beam is height-adjustably carried on said support.

12. The device according to claim 11, wherein said transverse beam includes a collar which is clampable to said support.

13. The device according to claim 9, wherein each of said hollow end beams includes a collar which is clampable to said free end of said transverse beam.

14. The device according to claim 9, wherein each of said four roller housings has a collar which is clampable to a respective one of said free ends of said hollow end beams.

15. The device according to claim 9, including a swivel joint connecting said bearing plate with said support.

16. The device according to claim 9, including telescoping protective tubes attached at said roller housings and extending from the cable guide to the cable saw, said protective tubes covering free lengths of saw cable extending between the cable saw and the cable guide.

\* \* \* \* \*